United States Patent
Yoon et al.

(10) Patent No.: US 7,389,439 B2
(45) Date of Patent: Jun. 17, 2008

(54) METHOD AND APPARATUS FOR MANAGING POWER OF PORTABLE COMPUTER SYSTEM

(75) Inventors: Sung-min Yoon, Seoul (KR); Baum-sauk Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 390 days.

(21) Appl. No.: 11/180,550

(22) Filed: Jul. 14, 2005

(65) Prior Publication Data

US 2006/0015758 A1 Jan. 19, 2006

(30) Foreign Application Priority Data

Jul. 15, 2004 (KR) ...................... 10-2004-0055249

(51) Int. Cl.
*H02J 1/00* (2006.01)
(52) U.S. Cl. .................... 713/323; 713/300; 713/310; 713/320; 713/321; 713/322; 713/324; 713/330; 713/340
(58) Field of Classification Search .......... 713/300, 713/310, 320–324, 330, 340
See application file for complete search history.

(56) References Cited

U.S. PATENT DOCUMENTS

| 5,532,935 A | 7/1996 | Ninomiya et al. |
| 5,915,120 A | 6/1999 | Wada et al. |
| 5,944,828 A * | 8/1999 | Matsuoka ................. 713/323 |
| 6,363,266 B1 * | 3/2002 | Nonogaki ................. 455/572 |
| 6,697,953 B1 * | 2/2004 | Collins .................... 713/320 |

FOREIGN PATENT DOCUMENTS

| JP | 5-0307431 | 11/1993 |
| JP | 9-026469 | 1/1997 |
| JP | 11-143595 | 5/1999 |
| KR | 1020010096576 | 11/2001 |
| KR | 1020020080615 | 10/2002 |

* cited by examiner

*Primary Examiner*—Abdelmoniem Elamin
(74) *Attorney, Agent, or Firm*—Roylance, Abrams, Berdo & Goodman, LLP (57) ABSTRACT

Provided is a method and apparatus for managing the power of a portable computer system, in which a convenient user interface is provided. The method includes calculating a range of a desired time-of-use based on power consumption of the portable computer system and a remaining battery capacity at a minimum power level of the portable computer system, providing the calculated range of the desired time-of-use and a desired time input box that allows a user to input the desired time-of-use, inputting the desired time-of-use through the desired time input box, and resetting the power level of the portable computer system according to the input desired time-of-use.

22 Claims, 7 Drawing Sheets

METHOD AND APPARATUS FOR MANAGING POWER OF PORTABLE COMPUTER SYSTEM

CROSS-REFERENCE TO RELATED APPLICATION

This application claims the benefit under 35 U.S.C. §119(a) of Korean Patent Application No. 10-2004-0055249 filed on Jul. 15, 2004 in the Korean Intellectual Property Office, the entire disclosure of which is hereby incorporated by reference.

BACKGROUND OF THE INVENTION

1. Field of the Invention

The present invention relates to the power management for a portable computer system. More particularly, the present invention relates to a method and apparatus for managing the power of a portable computer system, in which a convenient user interface is provided.

2. Description of the Related Art

Users often need to use portable computers in mobile environments. In mobile environments, users do not have access to a typical alternating current (AC) power source for their computers. In this situation, a rechargeable battery is generally used as a power supply instead of an AC power source. The amount of energy stored in a battery is proportional to the weight of the battery. In other words, to store more energy in a battery, the battery's weight inevitably must increase. Thus, a great amount of research has been conducted to improve the energy density and stability of batteries. As a result of such research, nickel cadmium (NiCd) batteries, nickel metal hydride (NiMH) batteries, lithium (Li+) batteries, and lithium polymer batteries have been produced in great numbers. Also, a fuel cell technology is being studied for use in mobile environments as a computer power supply. Although the amount of computing time users are getting in mobile environments can be increased by using a superior battery or many batteries, a battery with a high energy density is expensive and the use of many batteries results in an increase in the weight of a portable computer system. In particular, an increase in the weight of a portable computer system is an obstacle to the main advantage of the portable computer system, its mobility.

Thus, methods for reducing unnecessary power consumption through the power management of a portable computer system are being studied or have been developed. Korean Patent Publication No. 2002-0080615 discloses a method for managing the battery power in a portable computer, in which the length of time a specific function designated by a user can be used with the remaining battery capacity is estimated and displayed through multi-level modes. Additionally, the length of time a specific function can be used is selected or variably controlled by selecting one of the multi-level modes, thereby effectively reducing unnecessary battery power consumption of components that are unimportant when using the specific function and increasing the length of time the specific function can be used.

In Japanese Patent Publication No. 1999-143595, the power capacity of a device capable of setting a power saving mode and the power capacity of a device incapable of setting a power consumption mode are measured. The amount of power consumption by each device is recorded on a recording medium based on results of the measurement, and the recorded values are occasionally updated. Thereafter the power consumption of each device and the power consumption of the device without setting the power saving mode are measured based on the remaining battery power and a power saving setting level obtained from a recording medium. The operation time according to remaining battery power is estimated based on the power consumption of each device and the power consumption of the device without setting the power saving mode and is output.

Such techniques can increase the length of time a portable computer system can use a battery to a degree by preventing the unnecessary use of the battery. However, in most cases, users desire to secure the time required for a specific intended operation through a computer system, for example, one hour of word processing, instead of simply increasing the length of time, for instance, an extra hour and fifteen minutes, the computer system can be used through complicated battery power management. In other words, when users can sufficiently perform a desired operation with the remaining battery capacity, they may not feel the need to manage the power of the portable computer system. Even when power management is required, users may desire to secure the time they can work on computers by simply setting a desired amount of time, for instance, one hour, instead of through complicated selection.

In Korean Patent Publication No. 2001-0096576, upon a user's input of the amount of time required for operating a data processing system, the amount of available power is identified, the amount of power consumed by the data processing system when operating for the input amount of time using the available power is identified, and the amount of power consumption of the data processing system is set to the identified amount of power consumption. Thus, users can use the data processing system for a desired amount of time. However, Korean Patent Publication No. 2001-0096576 does not provide a limit on the amount of time input by users, for example, information indicating that the maximum amount of time input by users is 2 hours. As a result, if users input 3 hours as the amount of time required for operating the data processing system, they only receive a warning message without achieving their goals.

Therefore, it would be beneficial to provide a method and apparatus for managing the power of a portable computer, in which a limit on the amount of time users can use the portable computer and a convenient user interface, are provided.

SUMMARY OF THE INVENTION

The present invention provides a method and apparatus for managing the power of a portable computer system, in which a convenient user interface is provided.

The above stated object as well as other objects, features and advantages, of the present invention will become clear to those skilled in the art upon review of the following description.

According to an aspect of the present invention, there is provided a method for managing the power of a portable computer system. The method comprises calculating the range of a desired time-of-use based on power consumption and a remaining battery capacity at a minimum power level of the portable computer system, providing the calculated range of the desired time-of-use and a desired time input box that allows a user to input the desired time-of-use, inputting the desired time-of-use through the desired time input box, and resetting the power level of the portable computer system according to the input desired time-of-use.

According to another aspect of the present invention, there is provided an apparatus for managing the power of a portable computer system, comprising a graphical user interface which provides a user with the range of a desired time-of-use that is calculated based on the power consumption of the portable computer system at a minimum power level and a remaining battery capacity and includes a desired time input box that allows the user to input the desired time-of-use as selected made by the user, and a power manager which resets the power level of the portable computer system such that a total user time including the desired time-of-use input through the graphical user interface exceeds a remaining battery time.

According to still another aspect of the present invention, there is provided a portable computer system comprising a battery unit which supplies power, a plurality of devices which provide predetermined functions, a graphical user interface which provides a user with a range of a desired time-of-use that is calculated based on the power consumption of the portable computer system at a minimum power level and a remaining battery capacity and includes a desired time input box that allows the user to input the desired time-of-use as selected by the user, and a power manager which resets the power level of the portable computer system such that a total user time including the desired time-of-use input through the graphical user interface exceeds a remaining battery time for the present state of the portable computer system.

BRIEF DESCRIPTION OF THE DRAWINGS

The above and other features and advantages of the present invention will become more apparent by describing in detail exemplary embodiments thereof with reference to the attached drawings in which.

Like reference numerals refer to like elements throughout the specification.

DETAILED DESCRIPTION OF THE EXEMPLARY EMBODIMENTS

Advantages and features of the embodiments of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

The portable computer system used in the present invention operates with a battery power supply, preferably includes a plurality of devices with various functions such as a central processing unit (CPU), a display device, and a storage device, and has a computing function. Since the portable computer system includes a battery, it can be used by a mobile user. The portable computer system may use a typical alternating current (AC) power supply when available instead of the battery when the user is not on the move. A representative example of the portable computer system is a noteboOK computer, and the portable computer system may also be comprised in a personal digital assistant (PDA) or a mobile phone having a computing function.

Exemplary embodiments of the present invention will now be described in more detail with reference to the accompanying drawings.

Figure 1:
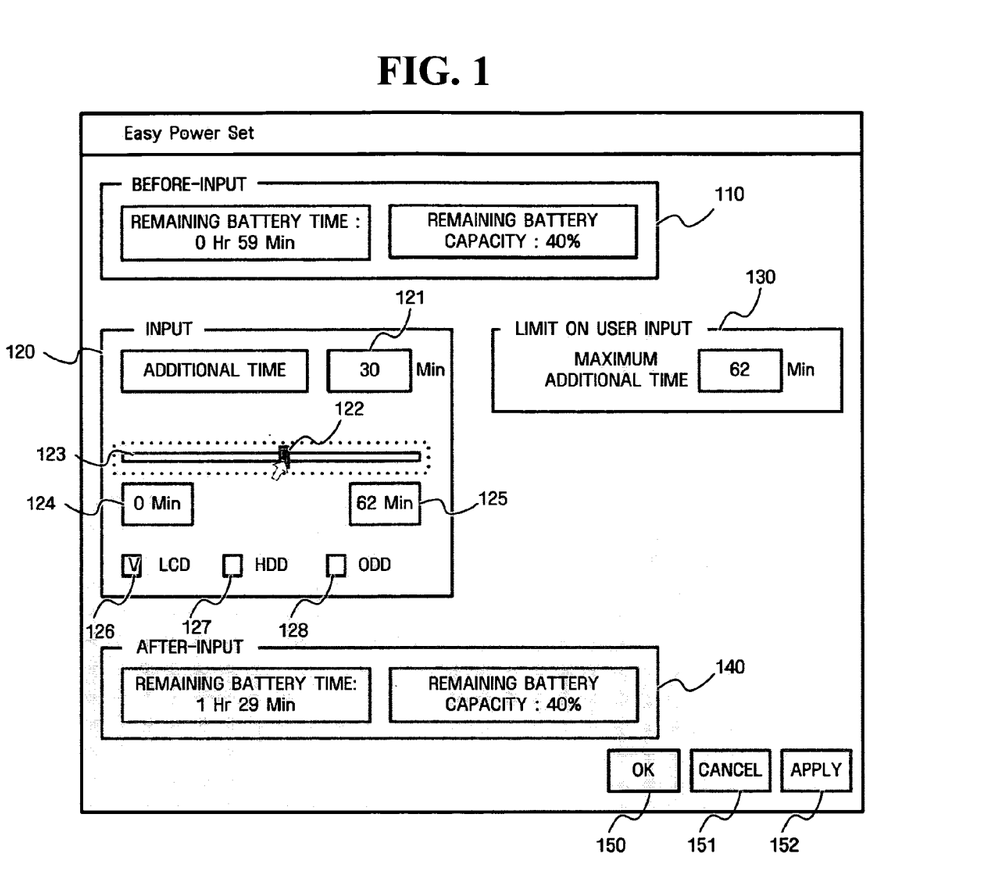
FIG. 1 illustrates a user interface for power management according to an embodiment of the present invention.
Figure 2:
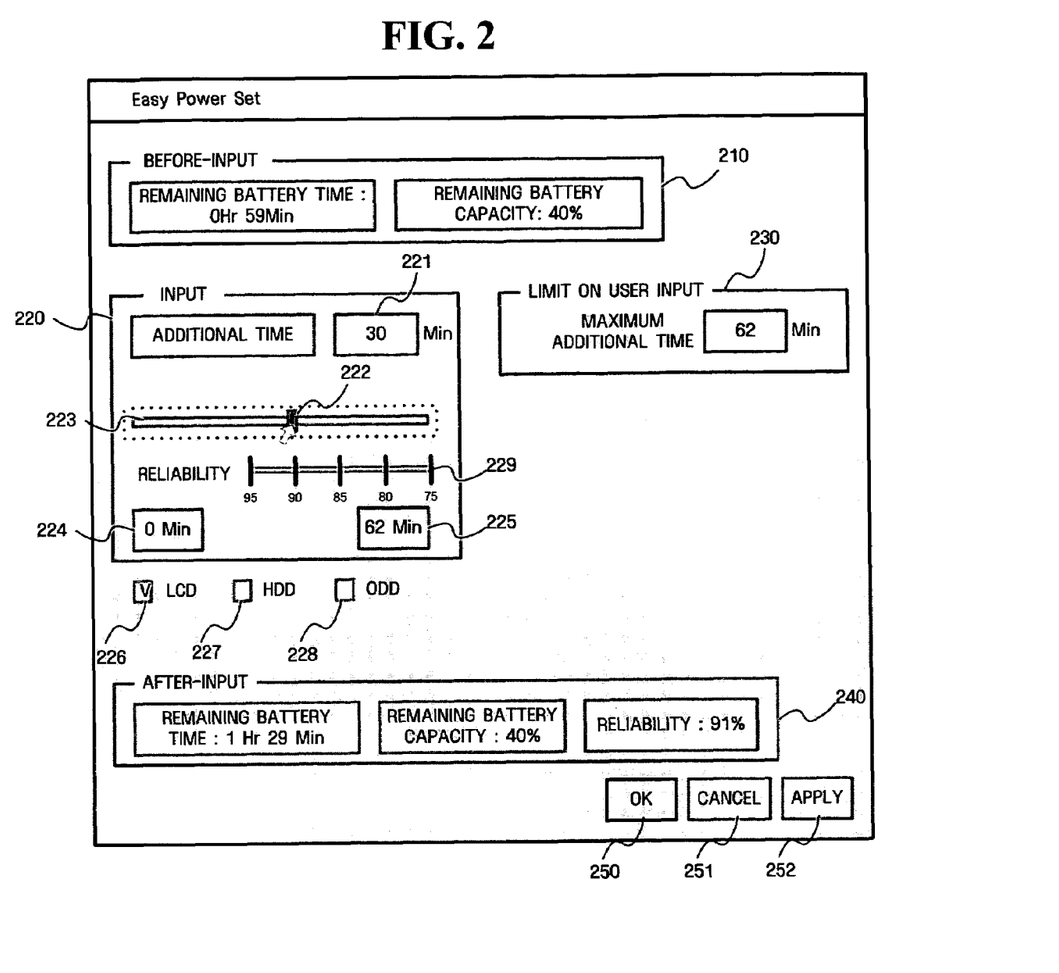
FIG. 2 illustrates a user interface according to another embodiment of the present invention.

FIG. 1 illustrates a user interface for power management according to an embodiment of the present invention and FIG. 2 illustrates a user interface according to another embodiment of the present invention. If a user inputs a desired amount of time (hereinafter referred to as a "desired time-of-use") into a user interface for power management, an apparatus for managing the power of a portable computer system attempts to secure the desired time-of-use with a remaining battery capacity by adjusting the power level of the portable computer system. The term "desired time-of-use" used in the embodiments of the present invention may be construed as including the amount of time the user desires to add to a current remaining battery time and. The amount of time the user actually desires to use the battery is the sum of the current remaining battery time and the amount of time the user desires to add to the current remaining battery time, hereinafter referred to as a "total user time". In the following embodiments, the desired time-of-use is defined as the amount of time the user desires to add to the current remaining battery time. However, such a definition is only an example and the technical spirit of the present invention also includes a definition where the desired time-of-use is the amount of time the user actually desires to use the battery or "total user time".

Referring to FIG. 1, the user interface is preferably provided to a user in the form of a graphic user interface (GUI). The user interface includes a before-input battery information box 110 that shows a power state before the user inputs an additional time, a time input box 120 to which the user can input an additional time, a maximum additional time information box 130, and an after-input battery information box 140.

The before-input battery information box 110 is provided to the user in a deactivated state and may include information such as a current remaining battery capacity and the amount of time the battery can be used with the current remaining battery capacity.

A limit on the additional time that can be input by the user is provided through the maximum additional time information box 130. The maximum additional time information box 130 is provided in a deactivated state and shows the user the maximum time that can be added.

The user can recognize the range of the desired time-of-use through the before-input battery information box 110 and the maximum additional time information box 130.

The time input box 120 is preferably provided to the user in an activated state and the user can input the amount of time to be additionally secured through the time input box 120. In an embodiment of the present invention, the time input box 120 includes a text box 121 into which the user can input the amount of time to be additionally obtained from managing the battery power. In another embodiment of the present invention, the time input box 120 includes a slider bar 123 that allows the user to select an additional time between a minimum additional time 124 and a maximum additional time 125. The user can select a desired additional time by preferably clicking and dragging a slider 122 on the slider bar 123. In still another embodiment of the present invention, the time input box 120 includes the text box 121 and the slider bar 123, and the slider 122 automatically moves to a corresponding additional time position on the slider bar 123 once the user inputs a desired additional time into the text box 121. Also, once the user moves the slider 122 to a specific additional time position on the slider bar 123, a corresponding additional time is automatically written in the text box 121.

The time input box 120 may further include at least one check box for designating priority in reducing the power levels of devices. For example, when a user watches a movie, the brightness of a liquid crystal display (LCD) may be important. In this case, the user can select an LCD check box 126 by clicking on the LCD check box 126 with an input device. Once the LCD check box 126 is selected, the power levels of devices other than the LCD are reduced before the power level of the LCD to secure an additional time desired by a user, for instance, 30 minutes. Similarly, when a specific program is installed in a hard disk (HDD), the user checks a HDD check box 127 with an input device. When the user watches a movie from a compact disc read only memory (CD-ROM) drive or a digital versatile disc read only memory (DVD-ROM) drive, a reduction in the power level of an optical device drive (ODD) such as the CD-ROM or the DVD-ROM should be avoided, if possible. To this end, the user may avoid such a reduction in the power level of the ODD by clicking on an ODD check box 128 with the mouse. In this embodiment, once a device is checked through a corresponding check box, adjustment of the power level of the device is avoided. In an embodiment, if a device check box is checked, the power level of a corresponding device is maintained higher than a predetermined value. For example, when the LCD check box 126 is not checked, the LCD may be powered off to reduce the power level of the LCD. However, if the LCD check box 126 is checked, the power level of the LCD is maintained higher than 50%. When a user listens to music, a higher amount of power supplied to the LCD may be unnecessary. However, when a user watches a movie, it is essential that a greater amount of power be supplied to the LCD. Such a predetermined value may be preset to a proper value by a manufacturer of portable computers, but may be preset by user's setting. If the LCD check box 126 is checked, the maximum additional time is automatically calculated again. In other words, the maximum power level that is calculated in a state where the power level of the LCD is 0% should be calculated again in a state where the power level of the LCD is 50%.

The after-input battery information box 140 provides the user with information about the remaining battery capacity after the user inputs the additional time and the remaining battery time.

The user interface may include an OK button 150, a cancel button 151, and an apply button 152. Once a user inputs an additional time or checks a check box and clicks the apply button 152 with the input device, the information set or changed by the user is stored. If the user clicks the cancel button 151 with the mouse, information set or changed by the user is not stored. If the user clicks the OK button 150 with the input device, the information set or changed by the user is stored and the user interface is terminated.

Next, referring to FIG. 2, the user interface according to another embodiment of the present invention includes a before-input battery information box 210 that shows a power state before the user inputs an additional time, a time input box 220 to which the user can input the additional time, a maximum additional time information box 230, and an after-input battery information box 240. The functions of the before-input battery information box 210 and the maximum additional time information box 230 are the same as the embodiment shown in FIG. 1.

The time input box 220 is preferably provided to the user in an activated state like the embodiment shown in FIG. 1, and the user can input the amount of time to be additionally secured through the time input box 220. The time input box 220 can selectively include a text box 121 or a slider 223 or both of them. Also, the user interface may include one or more check boxes 226, 227, and 228. The embodiment shown in FIG. 2 may further include a reliability indication box 229 in addition to the embodiment shown in FIG. 1. The user can select a desired additional time by clicking and dragging a slider bar 222 on the slider 223 with an input device. Actually, the selected additional time cannot always be secured. This is because the CPU resource consumed by applications and the amount of power consumed by peripheral devices may vary. Thus, in this embodiment, the relationship between reliability and an additional time, which is statistically obtained through experimentation by the manufacturer, is further included for a user's reference when the user selects a desired additional time. For example, when the maximum additional time is 62 minutes, if the user selects 62 minutes as an additional time, the reliability indication box 229 may indicate that 62 minutes is secured with a reliability of 75%. In other words, in selecting 62 minutes as the additional time, the user can take into consideration a 25% chance that the additional time selected by the user may not be secured. In other words, according to this embodiment, the user can select a proper additional time based on the reliability of the battery power supply.

In this embodiment, the after-input battery information box 240 may further provide reliability information in addition to information about the remaining battery capacity and the remaining battery time after the user inputs the additional time. In other words, the user can determine a current remaining battery time through the after-input battery information box 240 after inputting an additional time and understand that there is a 91% probability that the power supply will securely provide power for the current remaining battery time.

Like the embodiment shown in FIG. 1, the user interface may include an OK button 250, a cancel button 251, and an apply button 252.

Although the user inputs a desired additional time in the embodiments shown in FIGS. 1 and 2, the user may input the amount of time the user actually desires to use. In this case, the maximum additional time information box 230 is changed to a maximum available time information box and the time input box 220 may selectively include a text box into which the user can input a total user time (current remaining battery time+additional time) and/or a slider.

Figure 3:
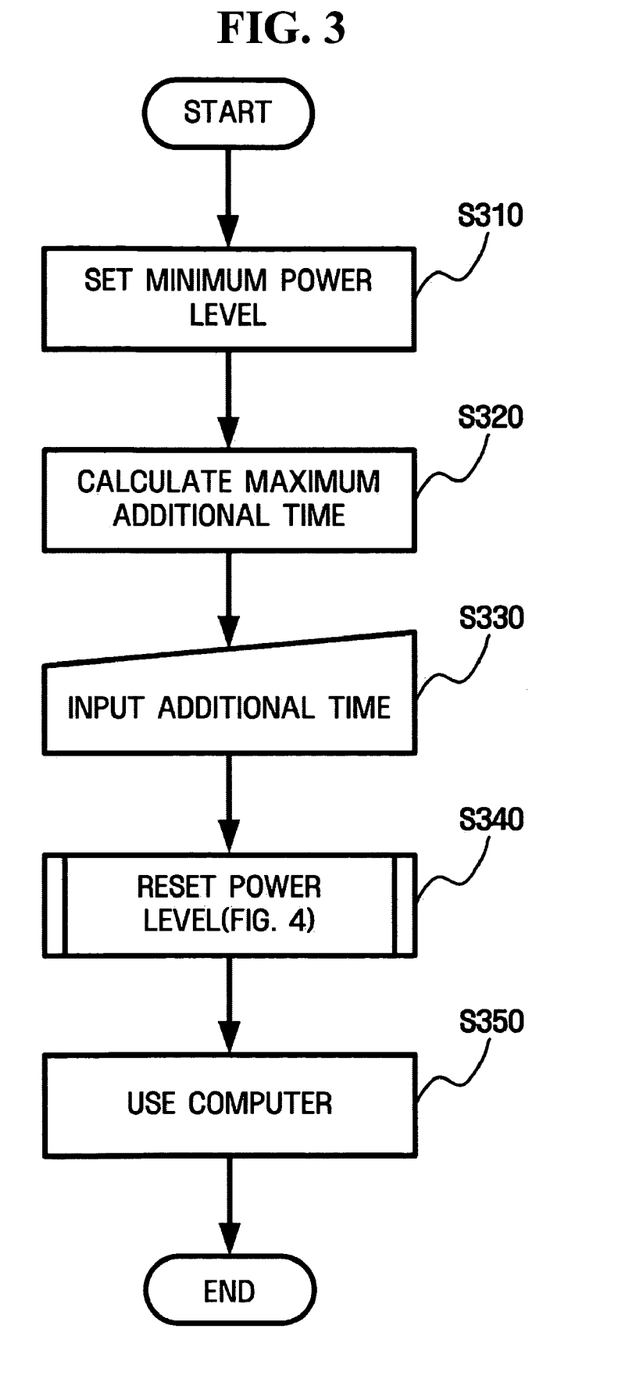
FIG. 3 is a flowchart illustrating a process for managing the power of a portable computer system according to an embodiment of the present invention.

FIG. 3 is a flowchart illustrating a process for managing the power of a portable computer system according to an embodiment of the present invention.

In step S310, the power level of a computer system is set to the minimum power level. In other words, the power level of the computer system is measured in a state where preferably the operating speed of a CPU is set to the minimum value and an HDD or ODD is powered off.

Once the power level of the computer system is set to the minimum power level, a maximum additional time is calculated based on the power consumption at the minimum power level and a current remaining battery capacity in step S320. The maximum additional time can be obtained by subtracting a current remaining battery time at a current power level from a current remaining battery time at the minimum power level. The obtained maximum additional time is provided to a user via a user interface, such as the graphical user interfaces shown in FIGS. 1 and 2, respectively.

The user then inputs an additional time (S330). Upon a user's input of the additional time, the power level is reset (S340). The user can secure the input additional time by resetting the power level lower than the current power level. Resetting of the power level will be described in more detail with reference to FIG. 4.

After the power level is reset, the user uses a computer for the desired amount of time in step S350.

Figure 4:
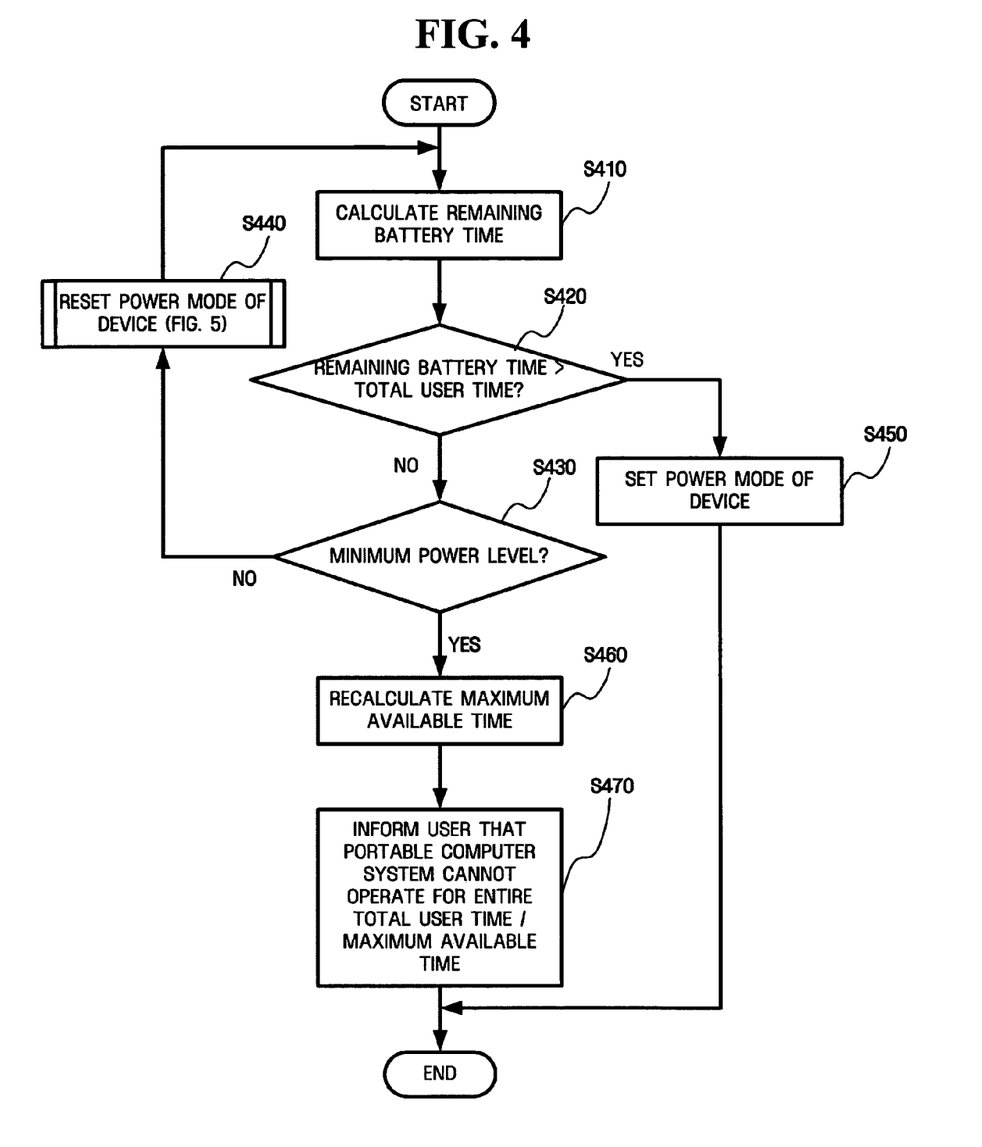
FIG. 4 is a flowchart illustrating in detail a process for resetting a power level according to an embodiment of the present invention.

FIG. 4 is a flowchart illustrating in detail a process for resetting a power level according to an embodiment of the present invention.

First, in step S410, the remaining battery time is calculated at a current power level. It is determined in step S420 whether the remaining battery time exceeds a total user time. The total user time means a final time to be secured after the user's input of the additional time. For example, when the remaining battery time is 1 hour and the additional time input by the user is 30 minutes, the total user time is 1 hour and 30 minutes.

When the remaining battery time does not exceed the total user time, it is determined in step S430 whether a device is at the minimum power level. If the device is not at the minimum power level, a power mode of the device is reset lower than a current power mode in step S440. Resetting of the power mode of the device will be described in more detail with reference to FIG. 5. After the power mode of the device is reset, the remaining battery time is calculated again in step S410. It is determined again in step S420 whether the remaining battery time exceeds the total user time. If the remaining battery time calculated while gradually reducing the power level of each device through the foregoing process exceeds the total user time, the power mode of each device is set to a power mode corresponding to the power level of each device in step S450. If a device reaches the minimum power level in a state where the remaining battery time does not exceed the total user time, the maximum available time in such a state is calculated again in step S460. The user is then informed of the fact that a portable computer system cannot operate up to the total user time and of the updated maximum available time in step S470. The user may input a new additional time based on the updated maximum available time.

In the embodiment shown in FIG. 4, the power level of the portable computer system is reset while gradually reducing the power level of each device until the remaining battery time exceeds the total user time. However, such a reduction is only an example, and the power level of the portable computer system may be reset while gradually reducing the power level of each device after setting an initial power level of each device based on the remaining battery time and the total user time. For example, if the remaining battery time is 1 hour and the total user time is 1 hour and 30 minutes, steps S410 through S470 may be performed to set the final power level of each device of the portable computer system after the initial power level of each device of the portable computer system is pre-set such that the power consumption of the portable computer system becomes about ⅔ of the current power consumption.

Figure 5:
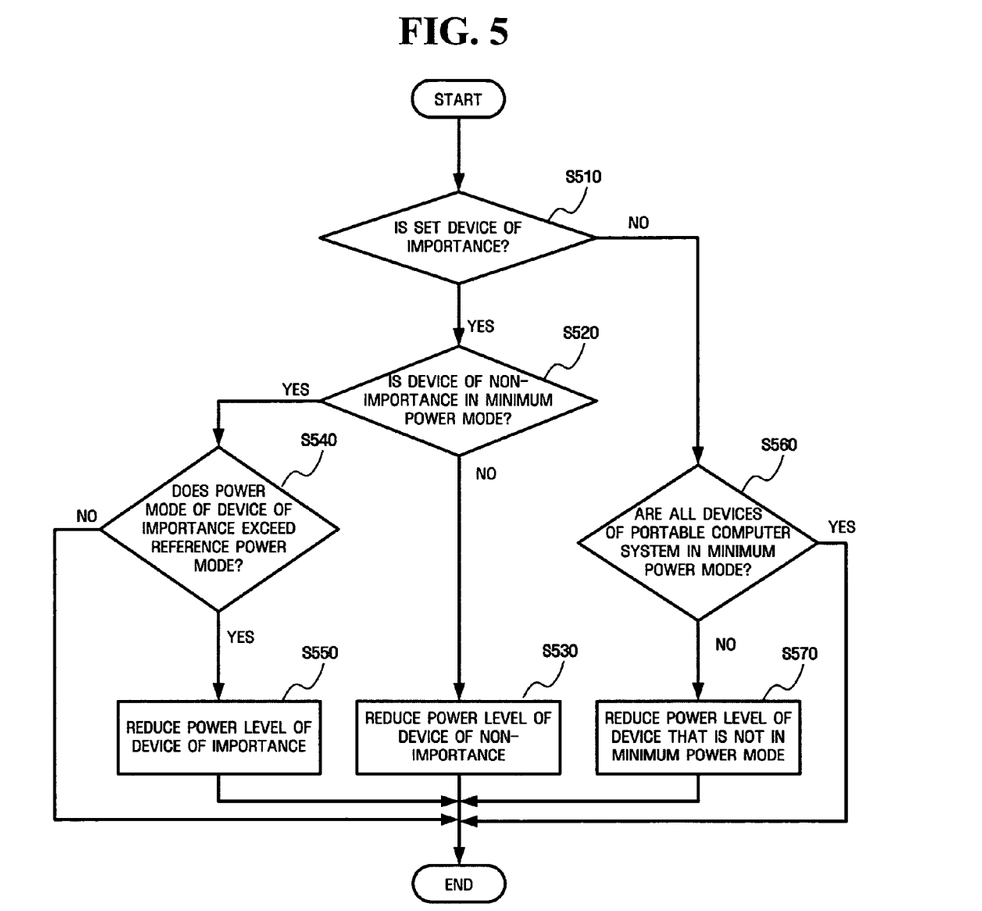
FIG. 5 is a flowchart illustrating in detail a process for resetting a power mode of a device according to an embodiment of the present invention.

FIG. 5 is a flowchart illustrating in detail a process for resetting a power mode of a device according to an embodiment of the present invention.

In step S510, it is determined whether a device of importance, such as a CCD, HDD or ODD, is set through a check box. If a device of importance is set, it is determined in step S520 whether a device of non-importance is in a minimum power mode. If the device of non-importance is not in the minimum power mode, the power level of the device of non-importance is reduced to the minimum power level in step S530.

If the device of non-importance is in the minimum power mode, it is determined in step S540 whether the power mode of the device of importance exceeds a reference power mode. The reference power mode indicates a lower limit of the power level to which the power level of the device of importance can be reduced. For example, when an LCD is the device of importance and the power level of the LCD is preset to be maintained higher than 50%, a power mode where the power level of the LCD is 50% is the reference power mode. However, if the LCD is not the device of importance, the reference power mode may be a power mode where the power level of the LCD is 0%. If the power mode of the device of importance exceeds the reference power mode, the power level of the device of importance is reduced in step S550. If the power mode of the device of importance is below the reference power mode, the power level of the device of importance is not reduced.

If the device of importance is not set, it is determined in step S560 whether all the devices of the portable computer system are in the minimum power mode. If all the devices are not in the minimum power mode, the power level of a device that is not in the minimum power mode is reduced in step S570. If all the devices are in the minimum power mode, the power level is not reduced for any of the devices.

Figure 6:
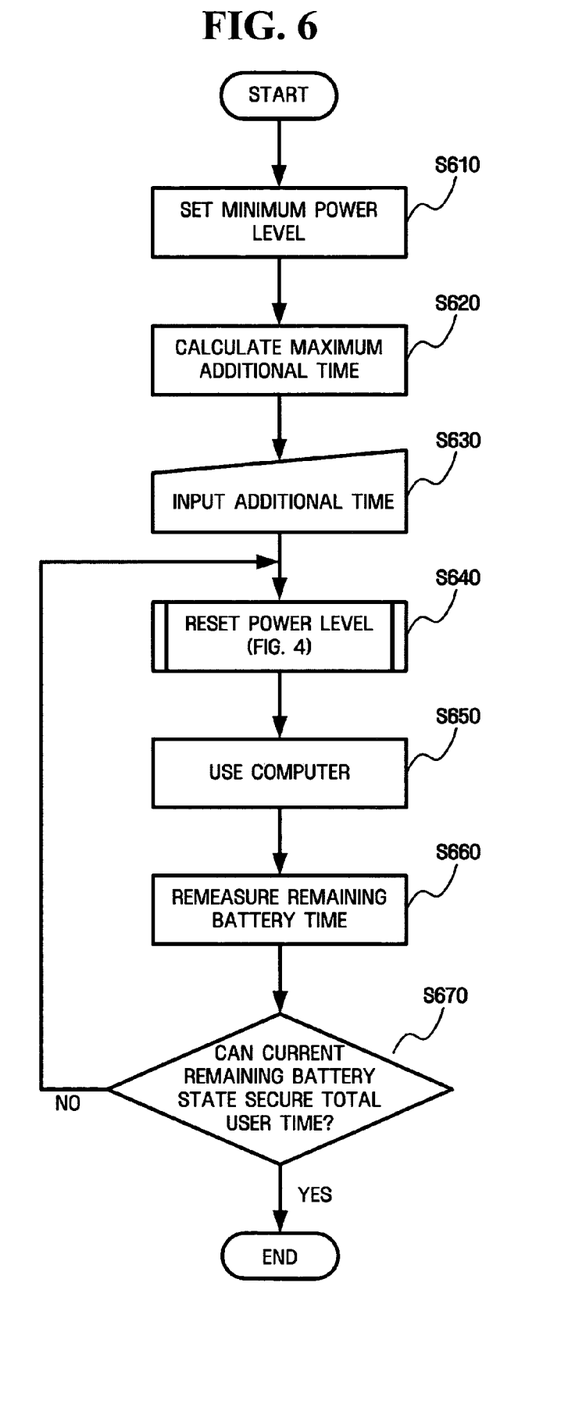
FIG. 6 is a flowchart illustrating a process for managing the power of a portable computer system according to another embodiment of the present invention.

FIG. 6 is a flowchart illustrating a process for managing the power of a portable computer system according to another embodiment of the present invention.

In step S610, the power level of the portable computer system is set to the minimum power level. In other words, the power level of the portable computer system is measured in a state where the operating speed of the CPU is set to the minimum value and an HDD or ODD is powered off.

Once the power level of the portable computer system is set to the minimum power level, the maximum additional time is calculated based on power consumption at that time and the remaining battery capacity in step S620. The maximum additional time can be obtained by subtracting the remaining battery time at a current power level from the remaining battery time at the minimum power level. The obtained maximum additional time is provided to a user.

The user then inputs an additional time in step S630. Upon the user's input of the additional time, the power level of the portable computer system is reset in step S640. The additional time input by the user can be obtained by resetting the power level lower than the current power level. Resetting of the power level is already described with reference to FIG. 4.

After the power level is reset, the user uses a computer for a desired amount of time in step S650. A remaining battery time is periodically measured at predetermined time intervals, such as in 10 minute intervals, (S660) during the use of the computer. After the remaining battery time is measured, it is determined in step S670 whether the battery in its current state can still obtain the total user time. Such a process is required because the total user time may not be secured with the remaining battery time obtained by reducing the power level through a power level resetting process (step S640). For example, when the amount of power used by the CPU of the portable computer system sharply increases, the amount of power consumption increases. In this case, the embodiment of FIG. 3 may not secure the total user time. However, the embodiment shown in FIG. 6 can obtain the total user time by further including the step of determining whether the total user time can be secured.

In other words, if it is determined that the total user time cannot be secured, the power level of each device is reset through the power level resetting process (step S640). The user then uses the computer in step S650. The power level resetting process (step S640) may be automatically performed without the user's specific manipulation as described above.

Figure 7:
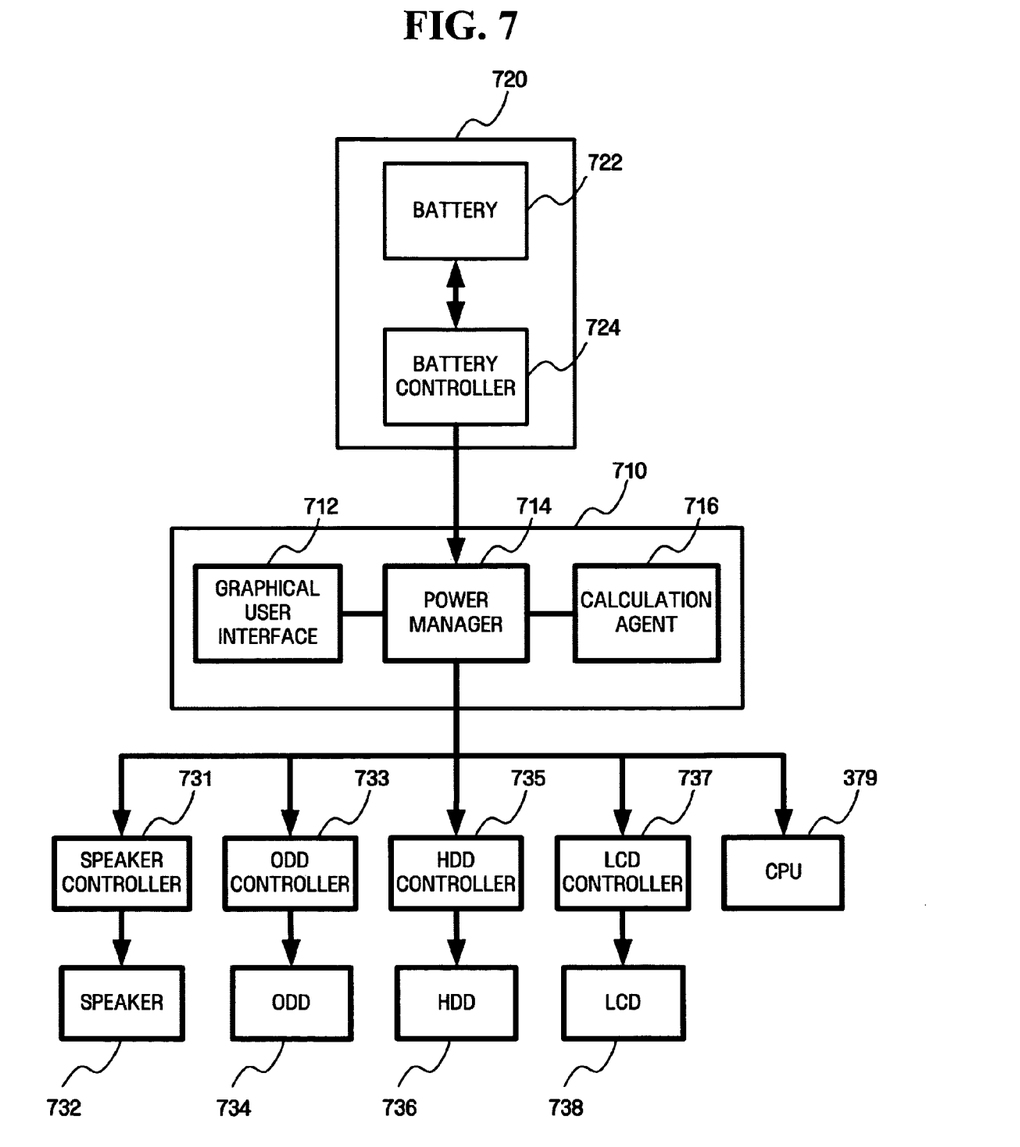
FIG. 7 is a block diagram of an apparatus for managing the power of a portable computer system according to an embodiment of the present invention.

FIG. 7 is a block diagram of an apparatus for managing the power of a portable computer system according to an embodiment of the present invention.

An apparatus 710 for managing the power of a portable computer system comprises a graphical user interface 712, a power manager 714, and a calculation agent 716.

The graphical user interface 712 provides a user with information such as a current battery state and the maximum available time of the portable computer system and a time input box into which a user can input an additional time.

The power manager 714 resets the power level of the portable computer system while reducing the power level of each device of the portable computer system so that the remaining battery time can be greater than a total user time including an additional time input through the graphical user interface 712.

The calculation agent 716 calculates the maximum additional time by subtracting a current remaining battery time at a current power level from a current remaining battery time at the minimum power level.

A battery unit 720 of the portable computer system comprises a battery 722 that converts chemical energy into electrical energy and a battery control unit 724 that checks the state of a battery and calculates the remaining capacity of the battery and the remaining amount of time that the battery will be capable of supplying sufficient power. The remaining battery capacity and time information of the battery unit 720 are transferred to the power manager 714.

The power manager 714 controls the power levels of the various devices included in the portable computer system. Examples of the devices included in the portable computer system are a speaker 732, an ODD 734, an HDD 736, an LCD 738, and a CPU 739. Each of the devices preferably includes its own controller. For example, the controllers may be a speaker controller 731 that controls the volume and tone of the speaker 732, an ODD controller 733 controls the reading, writing and deleting operations of the ODD 734, an HDD controller 735 that controls reading, writing and eliminating operations of the HDD 736, and an LCD controller 737 that controls the brightness or color of the LCD 738.

According to the embodiments of the present invention, a user can obtain a desired time to use a portable computer system by merely inputting desired time information without having to input complicated setting information. To this end, the embodiments of the present invention provide a range of desired time that can be input by the user and a time input box into which the user can input the desired time. Thus, the power level of a device that is regarded by a user as more important than other devices is reduced last after the power levels of the other devices are reduced. Thus, the user can use a portable computer for a desired amount of time in an optimized environment.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for managing the power of a portable computer system, the method comprising the steps of:
    calculating a range of a desired time-of-use based on power consumption at a minimum power level and a remaining battery capacity of the portable computer system;
    providing the calculated range of the desired time-of use and a desired time input box on a user interface that allows a user to input the desired time-of-use; inputting the desired time-of-use through the desired time input box;
    selecting the importance of one or more devices included in the portable computer system; and
    resetting the power level of the portable computer system according to the input desired time-of-use by gradually reducing the power level of the device that is not selected.

2. The method of claim 1, wherein the desired time input box comprises a text box that allows the user to input the desired time-of-use in the form of a number.

3. The method of claim 1, wherein the desired time input box comprises a slider having a continuous time value and a slider bar that moves on the slider and allows the user to determine the desired time-of-use according to user's selection.

4. The method of claim 1, wherein calculating the range of the desired time-of-use comprises the steps of:
    calculating a minimum power consumption of the portable computer system by setting the power level of each device included in the portable computer system to a minimum power level; and
    calculating the range of the desired time-of-use using the minimum power consumption and a remaining battery capacity.

5. The method of claim 1, wherein the step of resetting of the power level further comprises the step of gradually reducing the power level of each device included in the portable computer system until the desired time-of-use exceeds a remaining battery time.

6. The method of claim 1, further comprising the step of providing a check box for selecting the importance of one or more devices included in the portable computer system.

7. The method of claim 6, wherein the step of resetting of the power level further comprises the step of gradually reducing the power level of the device that is not checked in the check box.

8. The method of claim 1, wherein the resetting of the power level further comprises the steps of:
    setting an initial power level of each device according to the desired time-of-use and the remaining battery time; and
    setting a final power level of each device included in the portable computer system by reducing the power level of each device until the desired time-of-use exceeds the remaining battery time.

9. The method of claim 1, further comprising the step of determining whether a total user time is obtained after resetting of the power level, wherein if the total user time is not obtained, the power level is reset.

10. An apparatus for managing the power of a portable computer system, the apparatus comprising:
- a graphical user interface which provides a user with a range of a desired time-of-use that is calculated based on power consumption at a minimum power level and a remaining battery capacity of the portable computer system and comprises a desired time input box that allows the user to input the desired time-of-use as selected by the user, wherein the importance of one or more devices included in the portable computer system is selected through the graphical user interface; and
- a power manager which resets the power level of the portable computer system such that a total user time including the desired time-of-use input through the graphical user interface exceeds the remaining battery time, wherein the power manager gradually reduces the power level of the device that is not selected through the graphical user interface.

11. The apparatus of claim 10, wherein the desired time input box comprises a text box that allows the user to input the desired time-of-use in the form of a number.

12. The apparatus of claim 10, wherein the desired time input box includes a slider having a continuous time value and a slider bar that moves on the slider and allows the user to determine the desired time-of-use according to user's selection.

13. The apparatus of claim 10, wherein the graphical user interface further comprises a check box for selecting the importance of one or more devices included in the portable computer system, wherein the power manager gradually reduces the power level of the device that is not checked in the check box.

14. The apparatus of claim 10, wherein the power manager sets an initial power level of each device according to the desired time-of-use and the remaining battery time and sets a final power level of each device by reducing the power level of each device until the desired time-of-use exceeds the remaining battery time.

15. The apparatus of claim 10, wherein the power manger determines whether a total user time is secured after resetting of the power level and resets the power level if the total user time is not secured.

16. A portable computer system comprising:
- a battery unit which supplies power;
- a plurality of devices which provide predetermined functions;
- a graphical user interface which provides a user with a range of a desired time-of-use that is calculated based on power consumption at a minimum power level and a remaining battery capacity of the portable computer system and includes a desired time input box that allows the user to input the desired time-of-use as selected by the user, wherein the importance of one or more devices included in the portable computer system is selected through the graphical user interface; and
- a power manager which resets the power level of the portable computer system such that a total user time including the desired time-of-use input through the graphical use interface exceeds the remaining battery time, wherein the power manager gradually reduces the power level of the device that is not selected through the graphical user interface.

17. The portable computer system of claim 16, wherein the desired time input box comprises a text box that allows the user to input the desired-of-use time in the form of a number.

18. The portable computer system of claim 16, wherein the desired time input box comprises a slider having a continuous time value and a slider bar that moves on the slider and allows the user to determine the desired time-of-use according to a user's selection.

19. The portable computer system of claim 16, wherein the graphical user interface further comprises a check box for selecting the importance of one or more devices included in the portable computer system and the power manager gradually reduces the power level of the device that is not checked in the check box.

20. The portable computer system of claim 16, wherein the power manager sets an initial power level of each device according to the desired time-of-use and the remaining battery time and sets a final power level of each device included in the portable computer system by reducing the power level of each device until the desired time-of-use exceeds the remaining battery time.

21. The portable computer system of claim 16, wherein the power manger determines whether a total user time is secured after resetting of the power level and resets the power level if the total user time is not secured.

22. A recording medium having a computer readable program recorded therein, the program for executing a method for managing the power of a portable computer system, the method comprising:
- calculating a range of a desired time-of-use based on power consumption at a minimum power level and a remaining battery capacity of the portable computer system; providing the calculated range of the desired time-of-use and a desired time input box on a user interface that allows a user to input the desired time-of-use;
- inputting the desired time-of-use through the desired time input box; selecting the importance of one or more devices included in the portable computer system; and
- resetting the power level of the portable computer system according to the input desired time-of-use by gradually reducing the power level of the device that is not selected.

* * * * *